(12) United States Patent
Bruck

(10) Patent No.: US 9,358,635 B2
(45) Date of Patent: Jun. 7, 2016

(54) RASTERED LASER MELTING OF A CURVED SURFACE PATH WITH UNIFORM POWER DENSITY DISTRIBUTION

(71) Applicant: Gerald J. Bruck, Oviedo, FL (US)

(72) Inventor: Gerald J. Bruck, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 293 days.

(21) Appl. No.: 14/133,696

(22) Filed: Dec. 19, 2013

(65) Prior Publication Data

US 2015/0174699 A1 Jun. 25, 2015

(51) Int. Cl.
*B23K 26/00* (2014.01)
*B23K 26/08* (2014.01)

(52) U.S. Cl.
CPC .......... *B23K 26/0081* (2013.01); *B23K 26/0087* (2013.01); *B23K 26/082* (2015.10); *B23K 26/0807* (2013.01); *B23K 26/342* (2015.10)

(58) Field of Classification Search
CPC ........ B23K 26/0066; B23K 26/0081–26/0087; B23K 26/08–26/082; B23K 26/342
USPC .......................................... 219/121.6–121.83
See application file for complete search history.

(56) References Cited

U.S. PATENT DOCUMENTS

| 4,591,688 A | * | 5/1986 | Koch | ..................... B23K 15/02 219/121.29 |
| 5,603,853 A | * | 2/1997 | Mombo-Caristan | . B23K 15/006 219/121.14 |
| 6,676,892 B2 | | 1/2004 | Das et al. | |
| 6,747,245 B2 | | 6/2004 | Talwar et al. | |
| 2005/0242473 A1 | | 11/2005 | Newell et al. | |

FOREIGN PATENT DOCUMENTS

| DE | 102011078825 A1 | 10/2013 |
| EP | 2514553 A2 | 10/2012 |
| JP | 2002144061 A1 | 5/2002 |

* cited by examiner

*Primary Examiner* — Sang Y Paik

(57) ABSTRACT

A method of progressing a melt front (55) around a curved progression path (20) via a pattern (LP) of transverse laser scan lines (S1-S8) of differing lengths. Multiple area bands (B1-B8) conceptually divide a width of the curved path. The multiple transverse scan lines distribute the laser power among the bands with a predetermined uniformity that provides relatively consistent power density across the melt front. The scan lines may extend from a less curved side (24) of the curved path, through a band (B4 or B8) of largest area, toward a more curved side (22) of the path. At least one of the scan lines (S1, S8) may cross all bands. Other scan lines are shorter and extend by varying distances into the inner bands (B1-B3 or B1-B7), normalizing the power density across the bands.

20 Claims, 3 Drawing Sheets

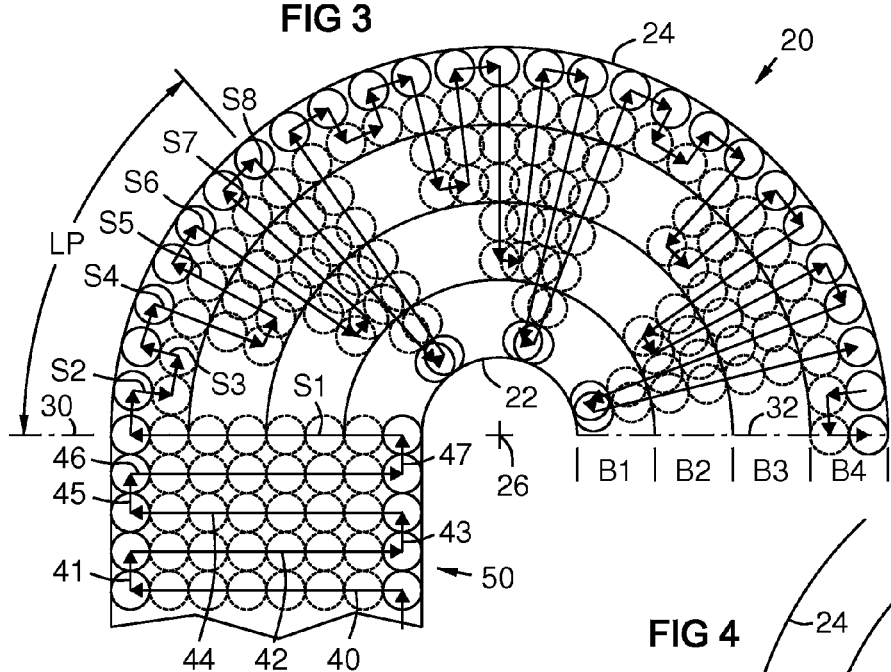
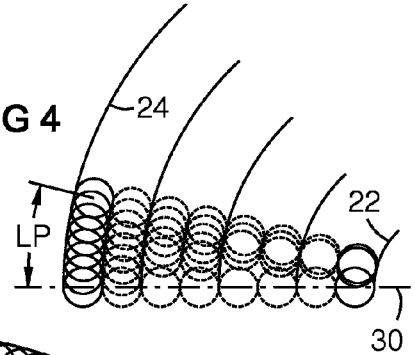
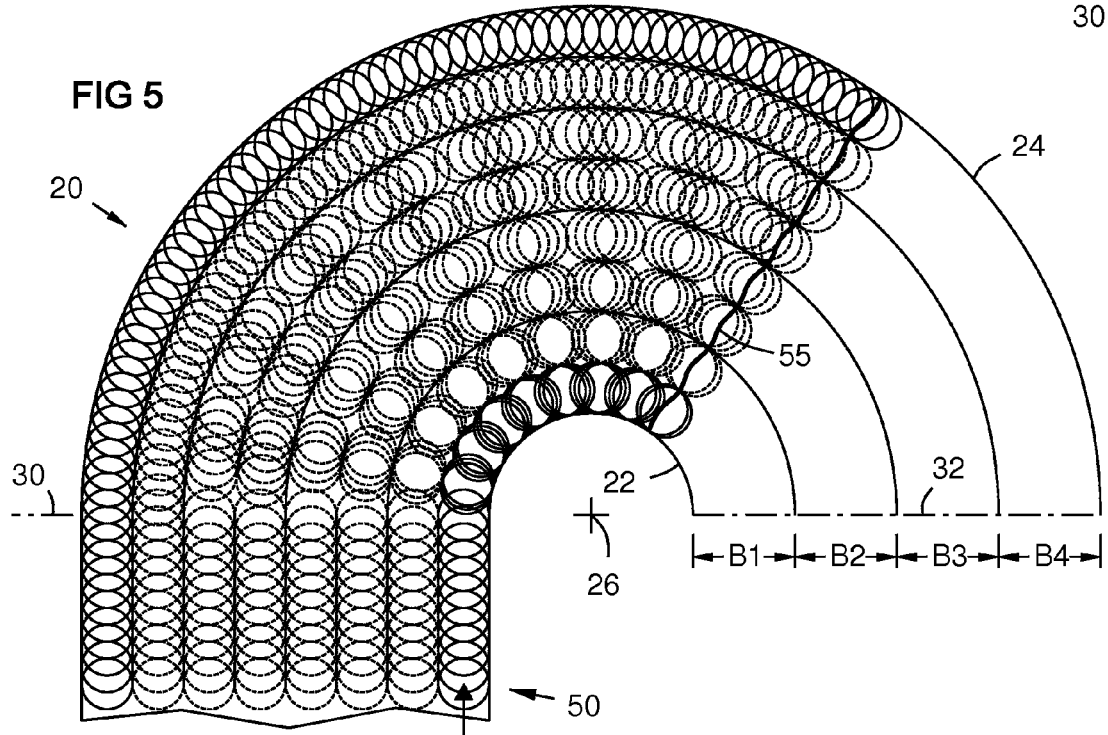

Curved path of scan progression is straightened for clarity.

RASTERED LASER MELTING OF A CURVED SURFACE PATH WITH UNIFORM POWER DENSITY DISTRIBUTION

FIELD OF THE INVENTION

The invention relates generally to the field of materials technology, and more particularly to scanning an energy beam over a material surface to produce a progressing melt front, and more particularly to rastering a laser beam on a curved progression path with scan lines that differ in length transverse to the progression path to provide uniform surface heating.

BACKGROUND OF THE INVENTION

Laser beam optical scanning over a surface has been used to melt or sinter materials for additive manufacturing and for purposes such as hardfacing, corrosion overlay, refurbishment or cladding. It is often valuable to provide a uniform power (and/or energy or heat) distribution to the surface to ensure minimal and consistent melting of the substrate, and thus low and uniform dilution. Low dilution is important for application of hardfacing, corrosion overlay or for refurbishment cladding—especially with materials that are difficult to weld because they are prone to cracking. Uniform power distribution is also important for uniform transformation hardening of surfaces. For cladding of broad areas, buildups in grooves, and hardening of complex surfaces such as gear teeth, customized optics such as mirrors rocked by specifically contoured cams were developed by the present inventor in the late 1980's. Such motor driven laser mirrors have been superseded by advanced galvanometer driven optics capable of moving the beam in three dimensions.

In conjunction with robotics, such optics are used for spot welding in automotive parts manufacture. Rastered laser cladding has also been performed with such optics. There are two common modes of rastering with such optics—"wobble" and "normal". In wobble rastering, the beam follows a path similar to the projection of a helical spring as viewed from the side. The beam spends more time at the ends of the scan lines, resulting in a power distribution to the substrate that applies more power at such locations and less at the center. This can result in over-melting at the sides producing inconsistent surface properties.

Normal rastering resolves the issue of over-melting associated with wobble rastering. With normal rastering, scanning is performed from left to right with periodic incrementing forward. The forward incrementing is nearly instantaneous compared to the left to right motion, so power distribution is nearly uniform over the area being exposed.

While normal scanning solves the issue of over-melting at both sides of the scan, an additional problem persists. That is, normal scanning provides uniform power for straight linear paths, but where the path curves or, for example, turns a corner, forward incrementing at the outer edge of the corner must be relatively large compared to forward incrementing at the inner edge of the corner in order to cover the larger circumferential distance at the larger radius. This results in a power density that is not uniform over the area being processed.

BRIEF DESCRIPTION OF THE DRAWINGS

The invention is explained in the following description in view of the drawings that show:

FIG. 3 shows how the pattern of FIG. 2 may progress around a curved surface path.

FIG. 4 shows the pattern of FIG. 3 using overlapping scans.

FIG. 5 shows repetitions of the pattern of FIG. 4 around the curved path.

DETAILED DESCRIPTION OF THE INVENTION

The inventor recognized that certain patterns of transverse scan lines of varying lengths can provide a more uniform power density along a progressing melt front across the width of a curved path of scan progression. This maintains the melt front in an optimum temperature range for consistent surface properties.

One skilled in the art will understand that the concepts of power (e.g. joules/second or watts) and energy (e.g. watt-seconds or joules) are both important when controlling a melt front, since the material being heated will naturally disperse energy via conduction, convection and radiation. For example, for a constant power, as more energy per unit area is delivered to a given depth of powder and substrate, more melting of the substrate (dilution) will occur. Also, for a constant energy per unit area of a moving energy beam, as more power is delivered to a given depth of powder and substrate, more melting of the substrate (dilution) will occur. The reason for this is that a greater rate of energy delivery (power) per unit area enhances more melting because it overwhelms the ability of the substrate to conduct heat away. (This may be considered to be analogous to a single large wave of the ocean penetrating farther onto shore than many smaller waves of equivalent total energy.) For simplicity of discussion, the word "power" is used herein to include both the concepts of power and/or energy to the extent that they affect the control of the melt front.

Figure 1:
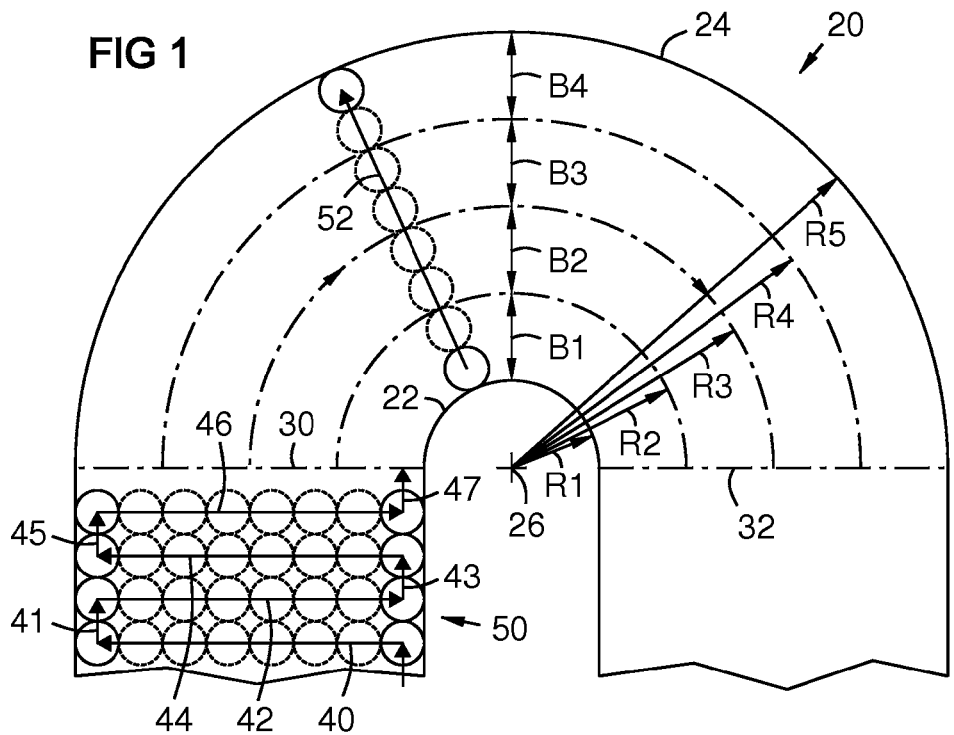
FIG. 1 is a top view of a curved surface path to be laser heated.

FIG. 1 shows a surface area of a material to be heated by an energy beam such as a laser. It includes a curved path 20, having an inner first side 22 with a smaller radius of curvature (sharper curvature) than an outer second side 24. The two sides may be inner 22 and outer 24 concentric arcs about a center point 26, or they may be other curves, such as elliptical or irregular curves. The curved path 20 begins 30 and ends 32 at lines normal to one or both sides 22, 24. In this example, lines 30 and 32 are aligned with radii from the center 26. The width of the curved path 20 may be conceptually subdivided into area bands B1-B4, which may have equal width. In this example, the bands are concentric with the sides 22, 24. The bands have respectively different areas as a percentage of the total area of the progression path 20. For example, with relative radii of R1=2, R2=4, R3=6, R4=8, and R5=10, the band area percentages of the total area around the curved path are approximately: B1=12%, B2=21%, B3=29%, and B4=38%.

Herein, "greater curvature" or "more curved" means more sharply curved, or having a relatively smaller radius of curvature. "Less curvature" means less sharply curved or having a greater radius of curvature. Herein "transverse scan line"

means a scan line that is less than 20 degrees from normal to one or both sides 22, 24 of the scan progression path 20.

A linear sequence of transverse scan lines 40, 42, 44, 46 is shown progressing by forward increments 41, 43, 45, 47 along a straight path 50. This is simplified for clarity, since the scans may overlap as later shown. The laser beam may have a predetermined beam width represented by the diameter of the circles, and a predetermined power. Although illustrated as discrete circles, it will be appreciated that the laser may be pulsed to transfer energy in such discrete circles, or it may be continuous to transfer a given amount of energy per area per time, represented by each circle, at a particular scan speed, such as ¼ m/s. The laser may move faster along the increment lines, such as 3 m/s. If the linear progression of scan lines 40-46 were continued and wrapped around the curved path 20 by aligning each successive scan line with radii R5, the power density would be uneven. This is exemplified by a radial scan line 52. It has two circles out of eight in each band B1-B4, so 25% of the power is applied to each band. But band B1 has only 12% of the total area of the curved path 20, while B4 has 38% of the total area, so the power density by band is uneven. If this type of scan line is repeated around the curved path 20, the power density (W/m$^2$) differs by a factor of 3 between the inner and outer bands ((25/12)/(25/38)=3.1) as shown in the table below. This wide variation in power densities across the width of the curved path produces a large temperature range along a melt front, resulting in inconsistent surface properties, as shown in Table 1.

TABLE 1

| Band | Power % | Area % | Power %/Band Area % |
|---|---|---|---|
| B1 | 25 | 12 | 2.08 |
| B2 | 25 | 21 | 1.19 |
| B3 | 25 | 29 | 0.86 |
| B4 | 25 | 38 | 0.66 |

Figure 2:
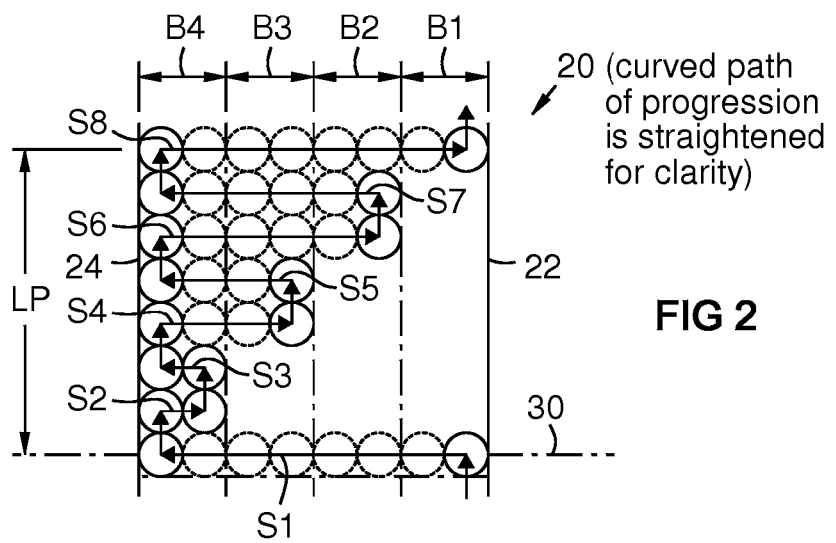
FIG. 2 is a top view of a pattern of laser scan lines progressing along the beginning portion of the curved path of FIG. 1, which is straightened for clarity.

FIG. 2 represents a beginning portion of the curved path 20 of FIG. 1 as if it were straightened for clarity. The beginning line 30 is shown. A sequence of transverse scan lines S1-S8 of different lengths forms a pattern that provides power more closely proportional to the respective areas of the bands B1-B4. The total power applied in this pattern (or sub-pattern of an entire curved path 20) along its length LP is represented by 40 circles. Four of the circles or 10% of the power is in band B1. Eight of the circles or 20% of the power is in band B2. Twelve of the circles or 30% of the power is in band B3. Sixteen of the circles or 40% of the power is in band B4. This power distribution more closely matches the respective areas of the bands B1-B4, as shown in Table 2.

TABLE 2

| Band | Power % | Area % | Power %/Band Area % |
|---|---|---|---|
| B1 | 10 | 12 | 0.83 |
| B2 | 20 | 21 | 0.95 |
| B3 | 30 | 29 | 1.03 |
| B4 | 40 | 38 | 1.05 |

The worst case in this example is a difference of less than 27% between B1 and B4 (1.05/0.83=1.265).

FIG. 3 shows how the pattern of scan lines S1-S8 of FIG. 2 may be wrapped around the curved path 20, and repeated multiple times from the beginning 30 to the end 32 of the path. In other embodiments where the direction of the melt front progresses around a smaller angle, for example around only a 45 degree bend, then the sub-pattern S1-S8 need not be repeated, or may be repeated fewer times. This is simplified for clarity, since the beam circle diameters normally overlap at the scan lines as later shown. Each scan line S1-S8 in this example is aligned with a radius from the center 26 of scan progression path 20. In non-circular curved paths, the scan lines may be aligned with lines normal to the inner curved side 22 and/or the outer curved side 24. Perfect alignment of any or all of the scan lines along such radii or normals of the curve is not essential. Some of the scan lines may be aligned to within less than 20 degrees of such a radius or normal line, but especially less than 10 or 5 degrees thereof. Transverse alignment maintains a wet melt pool across the width of the curved path 20 as the scans progress.

FIG. 4 shows the pattern of scan lines S1-S8 of FIG. 3 with an overlap in scan width (beam spot circle diameter; e.g. focus) at the radially outer ends of the scans. The overlap may be ⅔ in scan width or at least ⅒ in scan width. The overlap of adjacent scans increases toward the inner band B1 as the radial or normal lines of scan alignment converge. FIG. 5 shows repetition of the pattern of scan lines S1-S8 of FIG. 4 around the curved path 20, which maintains a consistent transverse melt front 55.

Figure 6:
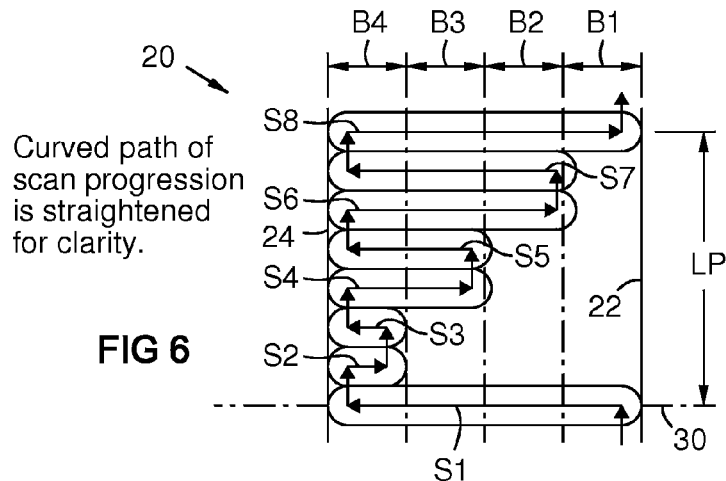
FIG. 6 shows an adjustment of the scan line lengths for improved uniformity.

FIG. 6 shows how power density differences among the bands can be further reduced or eliminated by finer adjustment of the scan line lengths. Here, the scan line lengths are not limited to multiples of the laser spot diameter, so scan lines S6 and S7 have been lengthened to overlap into band B1. Scan lines S4 and S5 have been lengthened to overlap into band B2. This enables the different lengths of the scan lines to fully normalize the power applied per band area among the different bands B1-B4. Perfect uniformity in power density among bands, is illustrated in Table 3 below. However, differences of less than 35% but especially less than 10% or 5% in power density between each combination of two bands can be acceptable.

TABLE 3

| Band | Power % | Area % | Power %/Band Area % |
|---|---|---|---|
| B1 | 10 | 10 | 1.00 |
| B2 | 20 | 20 | 1.00 |
| B3 | 30 | 30 | 1.00 |
| B4 | 40 | 40 | 1.00 |

Figure 7:
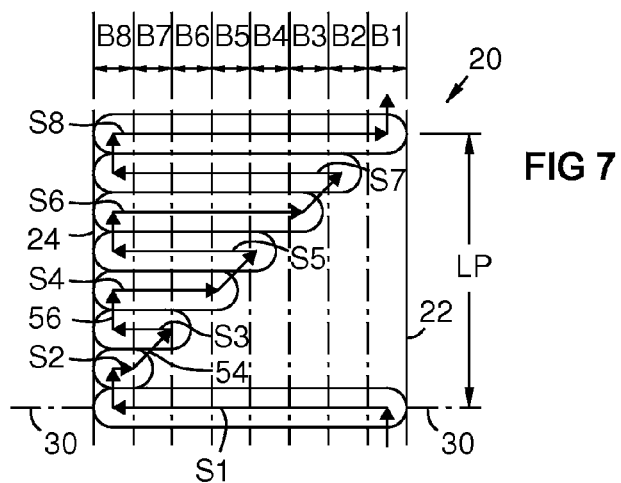
FIG. 7 shows another embodiment with higher band resolution.

FIG. 7 shows how power density variation over the total area of the scan path 20 can be reduced by finer banding B1-B8. Here, the increment lines 54 need not be normal to the scan lines, so successive scan lines can have individually different lengths as shown. The laser beam may be powered on or off during the increments 54, 56. If powered on, the increment lines and times are included in the power density calculations. By adjusting the different lengths of the scan lines S1-S8, the power density can be highly normalized across the width of the curved path 20.

Figure 8:
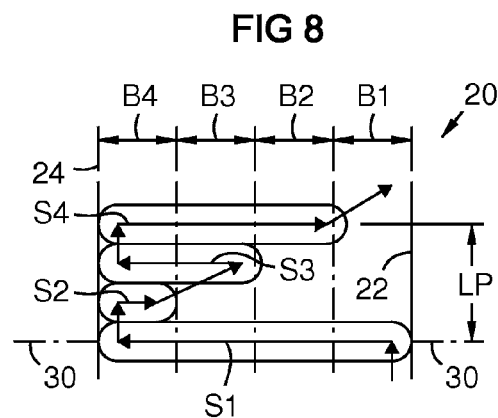
FIG. 8 shows an embodiment with the same power density ratios as in FIG. 6 using half the number of scan lines.

FIG. 8 shows an embodiment with the same power density proportions as in FIG. 6 (assuming the increments are powered off in both cases), but with only half the number of scan lines S1-S4. This pattern returns the beam to the inner band sooner than in FIG. 6, and thus refreshes the inner end of the melt front sooner.

The scan patterns herein may be designed using computer-aided design and applied using computer-aided manufacturing technology. When cladding near an edge, it is useful to apply lower power density along that edge to prevent over-melting near such limited heat sink. This may be accomplished with fewer scan increments near such edge and/or alternating the spacing of the scan lines from that edge. Conversely, when cladding near a wall, additional short scans may be provided on that side of the path to improve melting against such a greater heat sink.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A method comprising:
scanning a laser beam along a series of scan lines on a material surface;
progressing the scan lines in a curved path, wherein each scan line is oriented within 20 degrees of normal to the curved path;
forming a pattern of a plurality of the scan lines of differing lengths that delivers a power of the beam across a plurality of equal-width area bands equally dividing a width of the curved path;
wherein an area density of the power delivered to each band varies by less than 35% between each two of the bands along a length of the pattern as a result of the pattern;
wherein the energy beam, by following the pattern, creates a melt front progressing on the curved path on the material surface while maintaining said area density of the power along the melt front.

2. The method of claim 1, wherein a first side of the curved path has greater curvature than a second side, and further comprising forming the scan lines wherein the beam reaches the second side on each scan line of the pattern, and does not reach the first side on some scan lines of the pattern.

3. The method of claim 1, further comprising forming the scan line pattern wherein a total scan time in the pattern is apportioned among the bands according to an area percentage of each band relative to a total area of the pattern as a result of the differing lengths of the scan lines.

4. The method of claim 1, wherein a first side of the curved path has greater curvature than a second side, the bands have successively greater respective areas from the first side to the second side, and further comprising forming the scan line pattern wherein more of the scan lines of the pattern traverse ones of the bands with greater respective areas than traverse others of the bands with lesser respective areas.

5. The method of claim 1, wherein first and second sides of the curved path comprise respective radially inner and outer concentric arcs, the area bands comprise concentric bands of equal radial width between the arcs, and the scan lines of the pattern are aligned to within less than 10 degrees with successively spaced radii of the arcs.

6. The method of claim 5, wherein the successively spaced radii are evenly spaced at an angular distance that overlaps a scan width of the laser beam by at least 1/10 at radially outer ends of the scan lines.

7. The method of claim 1, wherein the scan lines progress sequentially in alternating directions, and are connected from end to end by increment lines that move the laser beam from an end of each scan line of the pattern to a beginning of a next scan line of the pattern.

8. The method of claim 7, wherein every scan line of a sub-pattern of the pattern has a different length transverse to the curved path, and the sub-pattern is repeated to form the pattern.

9. The method of claim 1 wherein the pattern starts and ends in a smallest one of the area bands by area.

10. The method of claim 1, wherein the plurality of equal-width area bands consists of 4 bands.

11. A method comprising:
directing a laser beam of a predetermined power and beam width along each of a series of scan lines in succession between a more curved side and a less curved side of a curved scan progression path on a material surface at a predetermined scan rate;
wherein each of the scan lines is less than 10 degrees from normal to one or both of the sides of the curved scan progression path, and the scan lines vary in length, forming a scan line pattern of a plurality of scan lines that provides a uniform power density of the laser within a difference of less than 10% between each two bands among a plurality of equal-width area bands equally dividing a width of the curved scan progression path;
wherein the energy beam, by following the pattern, creates a melt front that is elongated transverse to the curved scan progression path and progresses thereon while maintaining said uniform power density along the melt front.

12. The method of claim 11, further comprising forming the scan lines wherein the beam reaches the less curved side of the progression path on each scan line of the pattern, and does not reach the more curved side on some scan lines of the pattern.

13. The method of claim 11, further comprising forming the scan line pattern wherein a total scan time in the pattern is apportioned among the bands by an area percentage of each band relative to a total area of the pattern as a result of the varying lengths of the scan lines.

14. The method of claim 11, wherein the bands have successively greater respective areas from the less curved side to the more curved side, and further comprising forming the scan line pattern wherein more of the scan lines of the pattern traverse ones of the bands with greater respective areas than traverse others of the bands with lesser respective areas.

15. The method of claim 11, wherein the sides of the progression path comprise concentric arcs, the area bands comprise concentric bands of equal radial width between the arcs, and the scan lines of the pattern are each aligned within less than 5 degrees with successively spaced radii of the arcs.

16. A method comprising:
defining a curved progression path for a melt front on a material surface;
defining a sequence of transverse laser scan lines across the progression path that are each aligned within less than 10 degrees to a radius of curvature of the progression path, wherein the sequence of scan lines progresses along the progression path;
directing an energy beam along each of the scan lines in succession;
wherein at least some of the scan lines have different respective lengths, forming a scan line pattern that provides a surface power density of the energy beam that is uniform within a difference of less than 10% between each two bands in a plurality of equal-width area bands equally dividing a width of the progression path;
wherein the energy beam, by following the pattern, creates the melt front elongated transverse to the curved progression path and progressing thereon while maintaining said uniformity of the surface power density along a length of the melt front.

17. The method of claim 16, wherein the scan lines progress sequentially in alternating directions, and are connected from end to end by increment lines that move the energy beam from an end of each scan line of the pattern to a beginning of a next scan line of the pattern.

18. The method of claim 16, wherein every scan line of a scan line sub-pattern has a different length, and the sub-pattern is repeated.

19. The method of claim 16, wherein the pattern starts and ends in a smallest one of the bands by area.

20. The method of claim 16, wherein the step of directing an energy beam comprises directing a laser beam.

* * * * *